(12) United States Patent
Fey et al.

(10) Patent No.: US 8,641,148 B2
(45) Date of Patent: Feb. 4, 2014

(54) MOVABLE HEAD RESTRAINTS FOR VEHICLE SEATS

(75) Inventors: Ralph Fey, Zirndorf (DE); Zdzislaw Sobieski, Eching (DE); Karsten Mueller, Ingolstadt (DE)

(73) Assignee: Lear Corporation, Southfield, MI (US)

( * ) Notice: Subject to any disclaimer, the term of this patent is extended or adjusted under 35 U.S.C. 154(b) by 287 days.

(21) Appl. No.: 13/217,783

(22) Filed: Aug. 25, 2011

(65) Prior Publication Data

US 2012/0080922 A1 Apr. 5, 2012

(30) Foreign Application Priority Data

Oct. 4, 2010 (DE) .......................... 10 2010 041 942

(51) Int. Cl.
*B60R 22/28* (2006.01)

(52) U.S. Cl.
USPC ........................................................... 297/391

(58) Field of Classification Search
USPC .................. 297/391, 406, 407, 408, 409, 410
See application file for complete search history.

(56) References Cited

U.S. PATENT DOCUMENTS

| | | | | |
|---|---|---|---|---|
| 2,973,029 | A * | 2/1961 | Schlosstein | ............. 297/216.12 |
| 4,191,422 | A * | 3/1980 | Inasawa et al. | ............... 297/391 |
| 4,265,482 | A | 5/1981 | Nishimura et al. | |
| 4,674,797 | A | 6/1987 | Tateyama | |
| 4,856,848 | A | 8/1989 | O'Sullivan et al. | |
| 5,427,436 | A * | 6/1995 | Lloyd | ............................. 297/408 |
| 5,842,738 | A * | 12/1998 | Knoll et al. | ............... 297/216.12 |
| 6,471,296 | B2 | 10/2002 | Lance | |
| 6,983,995 | B1 * | 1/2006 | Veine et al. | .................... 297/391 |
| 7,073,863 | B1 | 7/2006 | Low et al. | |
| 7,267,407 | B1 | 9/2007 | Demick et al. | |
| 7,316,455 | B2 | 1/2008 | Metz et al. | |
| 7,562,936 | B1 | 7/2009 | Veine et al. | |
| 7,631,932 | B2 | 12/2009 | Hoffmann | |
| 8,038,219 | B2 * | 10/2011 | Boes et al. | ..................... 297/410 |

(Continued)

FOREIGN PATENT DOCUMENTS

| | | |
|---|---|---|
| DE | 10 2010 003 349 A1 | 11/2010 |
| EP | 0 352 234 A1 | 1/1990 |
| WO | 2004/089688 A1 | 10/2004 |
| WO | 2007/073034 A1 | 6/2007 |

OTHER PUBLICATIONS

German Office Action dated Jun. 7, 2011 in corresponding DE 10 2010 041 941.9, filed Oct. 4, 2010, 6 pgs.
German Office Action dated Jun. 7, 2011 in DE 10 2010 041 942.7, filed Oct. 4, 2010, 4 pgs.

*Primary Examiner* — Philip Gabler
(74) *Attorney, Agent, or Firm* — Brooks Kushman P.C.

(57) ABSTRACT

A vehicle head restraint assembly has a guide member mounted to a vehicle seat back. A head restraint is mounted to another guide member that has notches and is mounted to the first guide member for movement in a fore and aft direction. A biasing member biases a locking mechanism that is mounted to the first guide member into engagement with the notches. A first actuator is mounted to the first guide member for actuation in a lateral direction from one lateral side such that linear actuation of a first actuator compresses the biasing member to disengage the locking mechanism from the notches to permit adjustment of the fore and aft position of the head restraint. A second actuator is mounted to the first guide member for actuation in a direction perpendicular to the lateral direction and cooperates with the first actuator for actuating the first actuator.

14 Claims, 6 Drawing Sheets

(56) References Cited

U.S. PATENT DOCUMENTS

| | | |
|---|---|---|
| 2001/0028191 A1 | 10/2001 | Lance |
| 2008/0001456 A1 | 1/2008 | Muller et al. |
| 2008/0100118 A1 | 5/2008 | Young et al. |
| 2009/0058162 A1 | 3/2009 | Boes et al. |
| 2009/0146479 A1 | 6/2009 | Boes et al. |
| 2011/0109144 A1* | 5/2011 | Eckstein et al. ............... 297/409 |
| 2011/0187172 A1* | 8/2011 | Reel et al. ..................... 297/391 |

* cited by examiner

MOVABLE HEAD RESTRAINTS FOR VEHICLE SEATS

CROSS-REFERENCE TO RELATED APPLICATIONS

This application claims foreign priority benefits under 35 U.S.C. §119(a)-(d) to DE 10 2010 041 942.7, filed Oct. 4, 2010, the disclosure of which is hereby incorporated by reference in its entirety.

TECHNICAL FIELD

Various embodiments relate to a vehicle seat assembly having a movable head restraint.

BACKGROUND

Movable head restraints permit adjustment of a head restraint relative to a seat assembly. One such example is disclosed in U.S. Pat. No. 7,073,863 B1 to Low et al.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figures 1, 2:
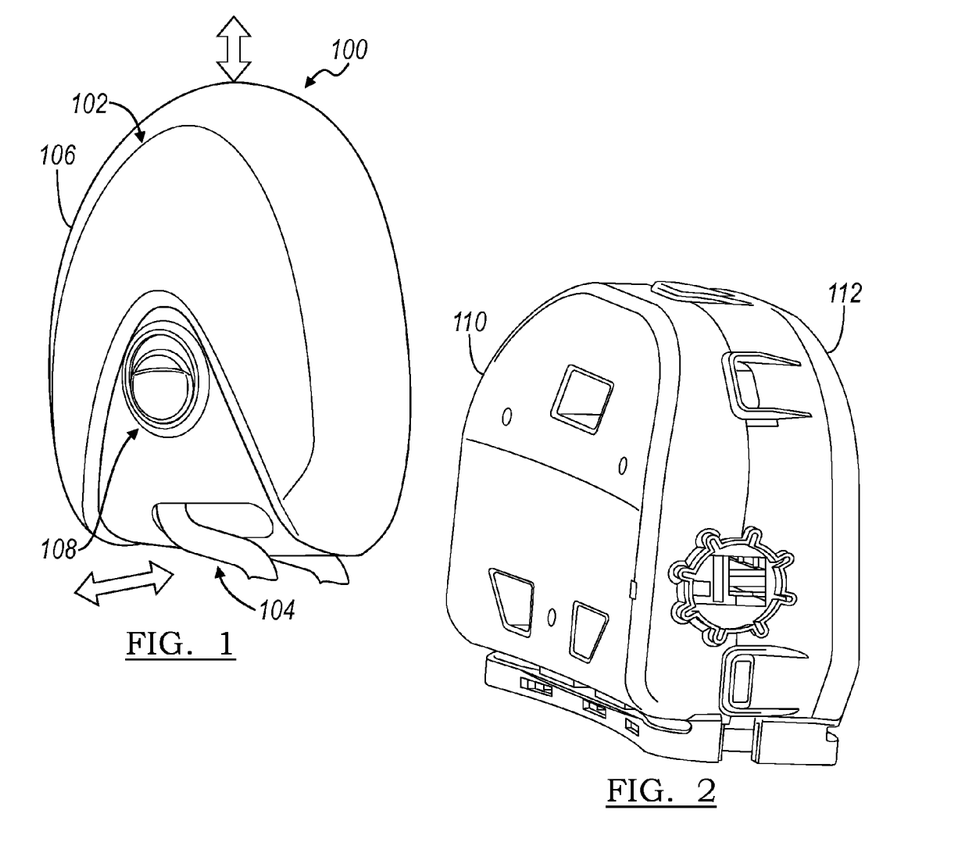
FIG. 1 is a side perspective view of a movable head restraint assembly according to at least one embodiment.
FIG. 2; is a side perspective view of the head restraint assembly of FIG. 1, illustrated partially disassembled.

Referring to FIG. 1, a movable head restraint assembly is illustrated in reference generally by numeral 100. The head restraint assembly 100 is provided adjacent a seat back of a vehicle seat and may be mounted directly to the vehicle seat or directly to the vehicle body adjacent the seat back for supporting the head of an occupant. The seat assembly may be for a vehicle such as a car, truck, aircraft, watercraft, or the like. The movable head restraint assembly 100 is illustrated including a head restraint 102 provided upon a support post 104. The support post 104 may be fixed relative to the vehicle or the vehicle seat back. The support post 104 may be received within a guide sleeve for upright adjustment relative to the seat back. The support post 104 may have any suitable configuration. For example, one or more support posts 104 may extend from the head restraint 102. Moreover, the support posts 104 may be generally U-shaped such that the pair of support posts 104 are formed integrally. The support posts 104 may be made of any suitable material or materials such as in metal or metal alloy.

The head restraint 102 may include a trim cover 106 for enclosing a cushion (not shown), a housing, and a locking mechanism. A manual button assembly 108 extends from the housing and the trim cover 106 for manual actuation for disengaging the locking mechanism. The button assembly 108 is illustrated oriented to be manually actuated by being slid in an upright direction. Pressing the button assembly 108 in the upright direction of FIG. 1 releases the locking mechanism and permits movement of the head restraint 102 relative to the support posts 104 in a fore and aft direction, which may be horizontal. In the depicted embodiment, the head restraint 106 is illustrated at a limit in one direction, the aft direction, relative to the vehicle. Thus, by sliding or tilting the button assembly 108, the occupant may move the head restraint 102 in the fore direction from the position depicted or to multiple incremental positions therebetween.

Prior art head restraint assemblies often utilize a push button for disengaging locking mechanisms. Due to a range of travel required by the locking mechanism in a lateral direction, the push button may be required to extend from the head restraint assembly in a lateral direction thereby increasing an overall lateral dimension of the head restraint assembly. By providing the button assembly 108 in a direction that is perpendicular to the lateral direction, a direction of travel required by the button assembly 108 does not significantly add to an overall lateral dimension of the head restraint 102.

Referring to FIG. 2, the head restraint 102 is illustrated with the trim cover 106 and cushioning removed thereby revealing the housing which is provided by a front shell 110 and a rear shell 112. The front and rear shells 110, 112 may be enclosed at least partially with the trim cover 106 and/or cushioning. The front and rear shells 110, 112 may provide a support structure and may include openings that face toward each other. The front and rear shells 110, 112 may engage or interlock with each other.

Figure 3:
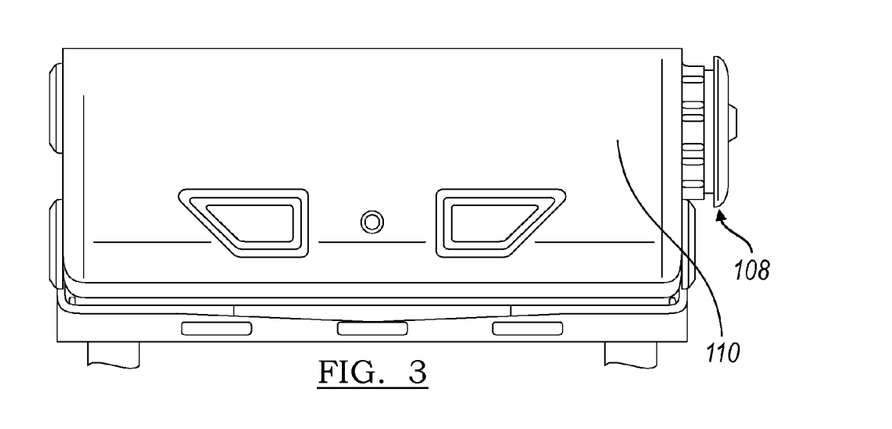
FIG. 3 is a front elevation view of the head restraint assembly of FIG. 1, illustrated partially disassembled.

Referring now to FIG. 3, the button assembly 108 for the depicted embodiment extends laterally from the shells 110, 112. For example, the button assembly 108 extends a distance that is less than sixteen millimeters, thereby resulting in a compact head restraint 102 in the lateral direction in comparison of prior art head restraint assemblies.

Figure 4:
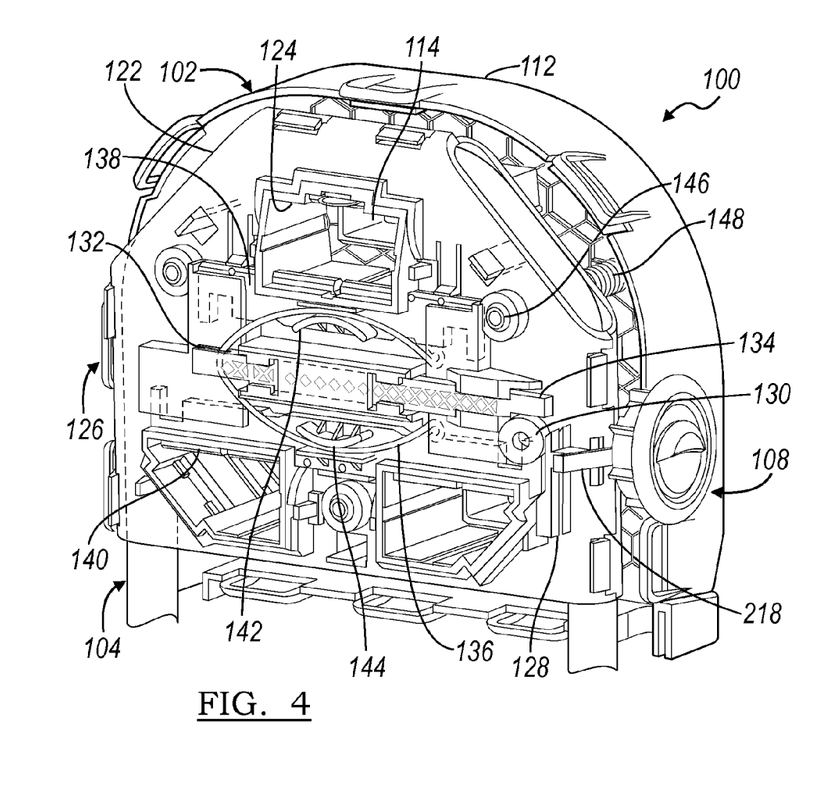
FIG. 4 is a perspective view of the head restraint assembly of FIG. 1, illustrated partially disassembled.
Figure 5:
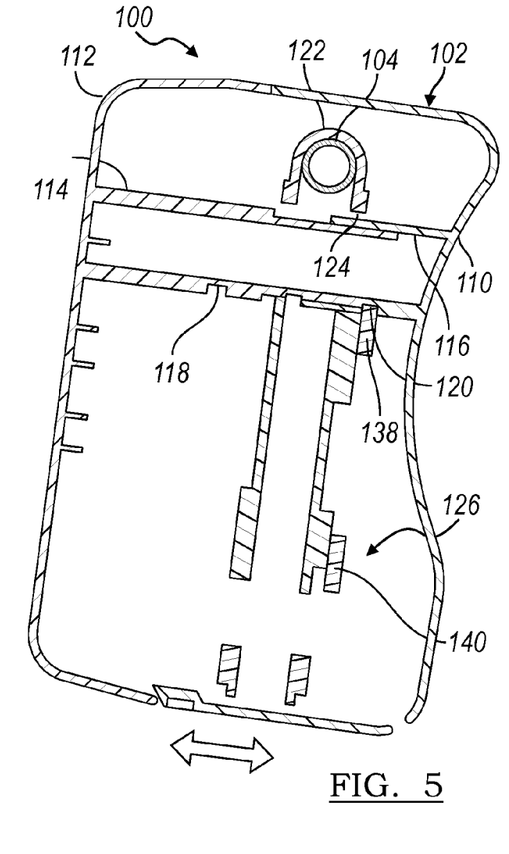
FIG. 5 is a section view of the head restraint assembly of FIG. 1.

Referring now to FIGS. 4 and 5, the head restraint assembly 100 is illustrated with components that are housed within the head restraint 102. The rear shell 112 includes a plurality of posts 114 that extend forward and engage corresponding posts 116 of the front shell 110. For the depicted embodiment, the rear shell 112 includes an array of posts 114, with an upper central post 114 and a pair of lower laterally spaced posts 114. Each of the posts 114 may have any suitable guide configuration. For the depicted embodiment, the upper post 114 is generally rectangular; and the lower posts 114 each include a bevel removing an outboard corner of the otherwise rectangular profile to facilitate with guidance in assembly of a corresponding guide member. Additionally, as illustrated in FIG. 5, each of the posts 114 includes a series of notches 118, 120 formed therein spaced incrementally in an axial direction of the posts 114, 116.

A traverse member 122 is disposed in the head restraint 102 upon the support posts 104. The traverse member 122 includes an array of sleeves 124 that are sized to receive the posts 114, 116 of the front and rear shells 110, 112. Each of the sleeves 124 may utilize any form of bushing, bearing, or slide for reducing friction.

The front shell 110 and the rear shell 112 are mounted for movement in a fore and aft direction upon the transverse member 122. The front and rear shells 110, 112 support the cushion and trim cover 106 of the head restraint 102. A locking mechanism 126 limits movement of the front and rear shells 110, 112, and consequently limits movement of the cushion and trim cover 106 relative to the traverse member 122 and permits fore and aft adjustment of the head restraint 102 relative to the support post 104 and consequently the seat back. The locking mechanism 126 is actuated by the button assembly 108, which may be provided to facilitate unlocking of the locking mechanism 126.

The button assembly 108 slides a first gear rack 128 in an upright direction. The gear rack 128 is mounted for translation in the traverse member 122. A pinion gear 130 is pivotally mounted to the traverse member 122 and is in engagement with the first gear rack 128. A push rod 132 is mounted to the traverse member 122 for actuation in a lateral direction from one lateral side of the head restraint 102. The push rod 132 includes a second gear rack 134 formed on a distal end thereof in engagement with the pinion gear 130. Thus, actuation of the button assembly 108 raises the first gear rack 128 thereby rotating the pinion gear 130 and driving the second gear rack 134 for consequently actuating the push rod 132 inboard.

The push rod 132 engages a leaf spring 136 at a central portion thereof that is spaced apart from a pair of ends that are fixed to the traverse member 122. A pair of locking arms 138, 140 are each mounted to the traverse member 122 to translate in an upright direction of the traverse member 122. The locking arms 138, 140 each extend into one of the sleeves 124 for engagement with one of the notches 118, 120 in the posts 114, 116. The leaf spring is retained in engagement with each of the locking arms 138, 140 by extending within a pair of retainers 142, 144 that are provided on the locking arms 138, 140. The leaf spring 136 in the unloaded position engages the retainers 142, 144 of each of the locking arms 138, 140 thereby urging the locking arms 138, 140 into engagement with the notches 118, 120 of the posts 114, 116 for locking the head restraint 102 in the fore and aft direction. When the push rod 132 is actuated in the inboard direction, the leaf spring 136 is compressed thereby retracting the locking arms 138, 140 out of the sleeves 124 for unlocking the posts 114, 116 and consequently the front and rear shells 110, 112 for movement in the fore and aft direction relative to the support posts 104.

The operation of the locking mechanism 126 is also illustrated and described in German patent application number DE 10 2010 003 349.9, filed Mar. 26, 2010, the disclosure of which is incorporated by reference in its entirety.

A series of posts 146 are provided on the rear shell 112 and extend to the traverse member 122. A series of coil springs 148 are each provided around the posts 146 for engaging the traverse member 122. According to one embodiment, the springs 148 are extension springs such that when the locking mechanism 126 is engaged, the springs 148 retract the shells 110, 112 to a forward-most orientation until it reaches a limit to the range of travel, or is stopped by the locking mechanism 126, or is stopped by a manual force provided by a body part of the occupant. Therefore, when the occupant unlocks the locking mechanism 126, the head restraint 102 is urged to a reset position that is in the forward direction as permitted by the occupant. Thus, the springs 148 urge the head restraint 102 towards the head of the occupant for optimizing convenience, comfort and safety. Alternatively, the springs 148 could be compression springs for retracting the head restraint 102.

Figure 6:
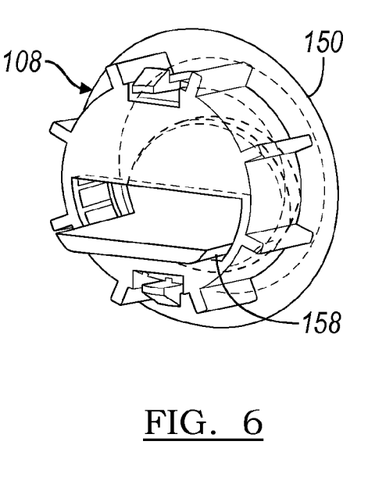
FIG. 6 is a perspective view of a manual button assembly of the head restraint assembly of FIG. 1.
Figure 7:
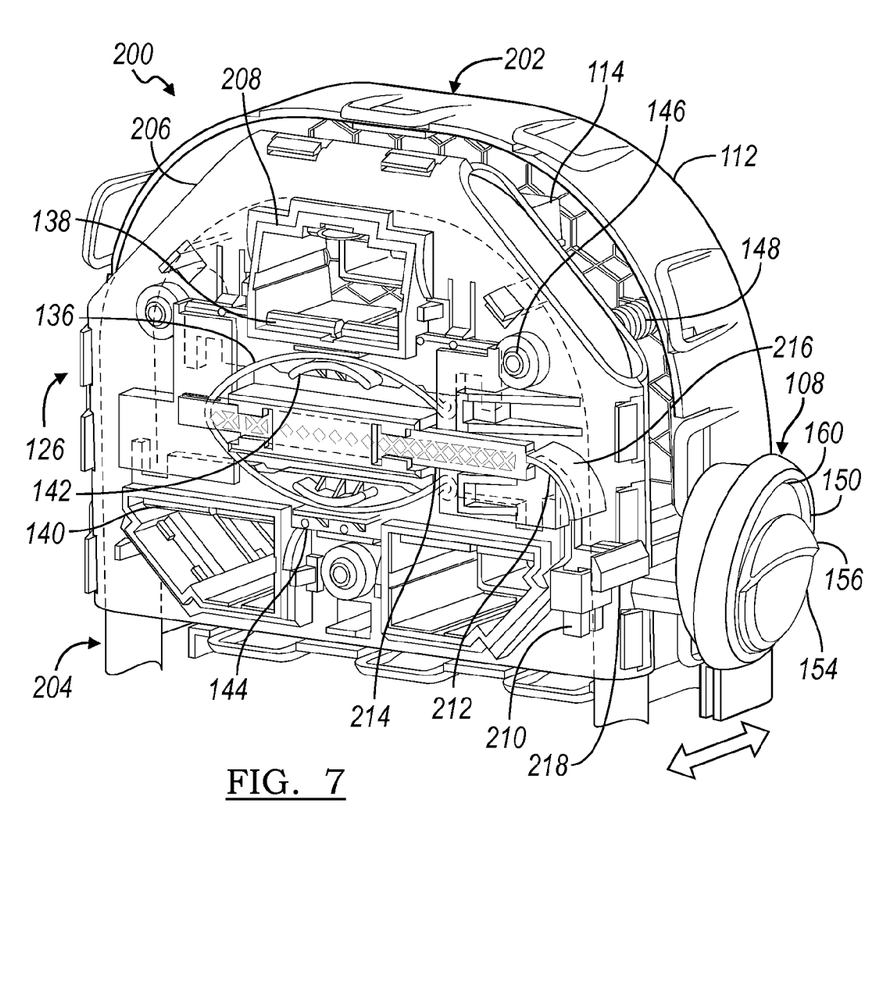
FIG. 7 is a perspective view of the head restraint assembly of FIG. 1 according to another embodiment, illustrated partially disassembled.
Figures 8, 9, 10, 11:
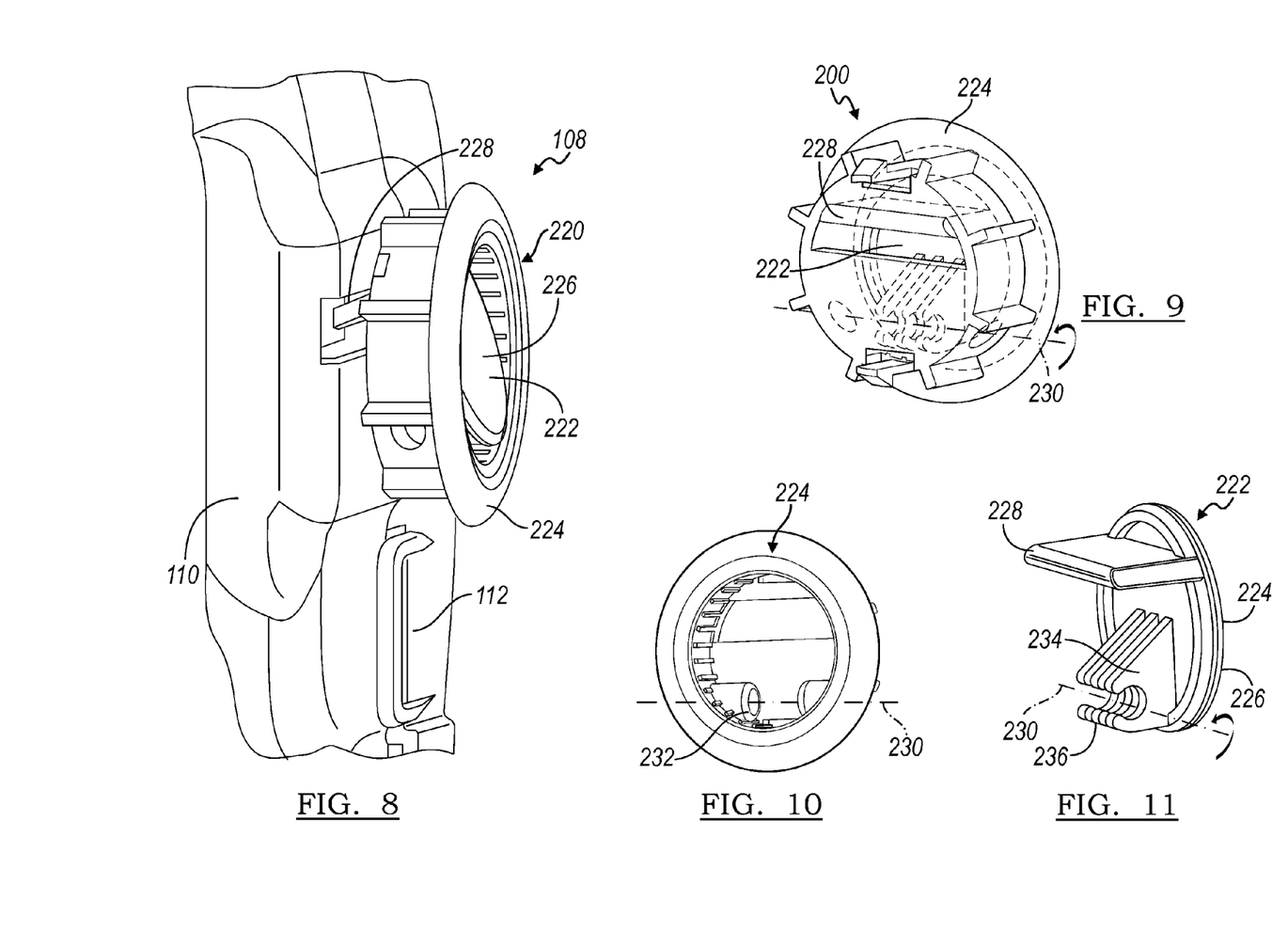
FIG. 8 is a perspective view of a portion of the head restraint assembly of FIG. 1 including a manual button assembly according to another embodiment.
FIG. 9 a perspective view of the manual button assembly of the head restraint assembly of FIG. 8.
FIG. 10 a perspective view of a component of the manual button assembly of the head restraint assembly of FIG. 8.
FIG. 11 a perspective view of a component of the manual button assembly of the head restraint assembly of FIG. 8.

Referring now to FIGS. 6 and 7, the button assembly 108 may be a slide button 150. The slide button 150 may be mounted on a lateral side 152 of the head restraint 102. In order to actuate the slide button 150, the slide button 150 may slide or translate in a direction perpendicular to the lateral direction of the head restraint 102. The slide button 150 may be actuated by an occupant by pushing or sliding a slide button face 154 in a direction parallel to the lateral side 152 of the head restraint 102.

The slide button face 154 may include a raised element 156 in order to allow an occupant to grip the slide button face 154 easier when actuating the slide button 150. The slide button 150 may also include a projection arm 158 which extends inboard from the button face 154. When mounted on the head restraint 102, the projection arm 158 may extend in a direction parallel to the lateral direction. The projection arm 158 may extend inboard from the button face 154 and be generally perpendicular to the button face 154. As such, the projection arm 158 may move in the same direction as the slide button face 154.

The slide button assembly may be mounted in a flange 160. The flange 160 may be on an outboard surface of the head restraint 102 through an opening in the cushion or integrally formed in the shells 110, 112. The flange 160 may have a diameter larger than the diameter of the slide button face 154 in order to allow the slide button face to translate within the flange 160.

An adjustable head restraint assembly 200 is depicted according to another embodiment. The head restraint assembly 200 includes a head restraint 202 upon a support post 204. A traverse member 206 is provided upon the support post 204. The traverse member 206 is provided with a locking mechanism 126 according to the prior embodiment for extending into sleeves 208 of the traverse member 206 and engaging posts 114, 116 of front and rear shells 110, 112.

The button assembly 108 is provided upon the shells 110, 112 for actuating a first linear slide 210 that is mounted to the traverse member 206 for translation in the upright direction. A flexible band 212 is connected to one end of the linear slider 210 and to an inboard end of a push rod 214 of the locking mechanism 126. The flexible band 212 is retained within a guide 216 on the traverse member 206. The flexible band 212 is generally arcuate about a radius that has an axis in the fore and aft direction. The band 212 has a rectangular cross section with a width extending in the fore and aft direction and a thickness in a radial direction. The width is greater than the thickness of the band 212 for providing resiliency to translate and push the push rod 214, while providing flexibility for converting linear motion of the linear slider 210 in the upright direction to linear motion of the push rod 214 in the laterally inboard direction. The flexible band 212 may be formed of any suitable material such as a flexible polymeric material and may be formed integrally with the linear slider 210 and the push rod 214.

The locking mechanism 126 may include an elongated bar 218 which may be connected to the button assembly 108. As such, the elongated bar 218 may be connected to the projection arm 158 of the slide button 150. The length of the elongated bar 218 may be substantially longer than the width of the projection arm 158 so that the projection arm may maintain in contact with the elongated bar 218 as the locking mechanism 126 moves in the fore aft direction.

In one embodiment of the invention, the slide button may translate in an upright direction. The upright direction may be generally vertical where the head restraint and seat back are also vertical. As such, the upright direction may be generally perpendicular to the lateral direction. Where the side button face 154 is actuated in the upright direction, the projection arm 158 may engage an underside of the elongated bar 218. It is also contemplated that the elongated bar 218 may also include a groove or other engagement feature to receive the projection arm 158.

In the embodiment depicted in FIG. 7, the elongated bar 218 may be disposed on the linear slider 210. By moving the slide button face 154 in an upright direction, the projection arm 158 may also move in the upright direction thereby moving the elongated bar 218 and the linear slider 210 in the upright direction as well. The elongated bar 218 may also be provided with the locking mechanism 126 according to the prior embodiments. For example, the elongated bar 218 may be disposed on the first gear rack 128 as shown in FIG. 4. Likewise, in this embodiment, when the slide button face 154 is translated in the upright direction, the projection arm 158 would also move in the upright direction thereby raising the first gear rack 128 in the upright direction as well.

FIGS. 8 through 11 depict a button assembly 108 according to another embodiment. It is also contemplated that the button assembly 108 may be a rocker button assembly 220. The rocker button assembly 220 may be mounted on the lateral side 152 of the head restraint 102. The rocker button 220 may be pivotally mounted relative to the head restraint 102.

The rocker button assembly 220 may include a rocker member 222 which is adapted to pivot relative to a mounting flange 224. The rocker member 222 which includes a button face 226 and the lever 228. The rocker button face 226 may be generally planar from which the lever 228 may extends.

The mounting flange 224 may be mounted on the head restraint 102 or, alternatively, integrally formed in the front and rear shells 110, 112. The mounting flange 224 may include a fulcrum portion 232 which defines the pivot axis 230 of the rocker button assembly 222. The rocker member 222 may further include a fulcrum extension 234 which is adapted to align with the fulcrum portion 232 of the flange 224. The fulcrum extension 234 may include an aperture 236 which may align with the pivot axis 230.

When the rocker button assembly 220 is actuated by an occupant, the button face 226 may tilt thereby pivoting the lever 228 in a direction perpendicular to the lateral direction. The rocker button assembly 222 may cooperate with the locking mechanism 126. As such, the locking mechanism 126 of the embodiments depicted in FIGS. 4 and 7 may be disengaged by pivoting of the lever 228.

The button actuator 108, such as the slide button 150 or the rocker button 220, may be biased so that when the button actuator is no longer manually actuated by an occupant, the button actuator returns to a locked position such that the head restraint is prevented from moving fore and aft. Additionally, the button actuator 108 may be biased by forces from the leaf spring 136 so that when the button actuator 108 is no longer manually actuated by an occupant the button actuator 108 returns to a locked position such that the head restraint 202 is prevented from moving fore and aft.

Figure 12:
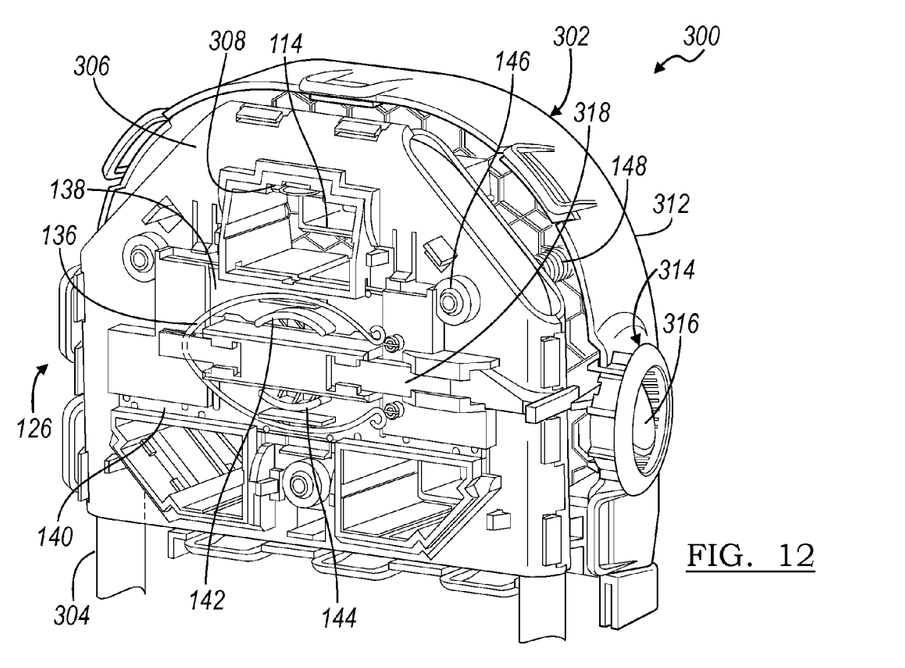
FIG. 12 is a perspective view of a movable head restraint assembly according to another embodiment, illustrated partially disassembled.
Figure 13:
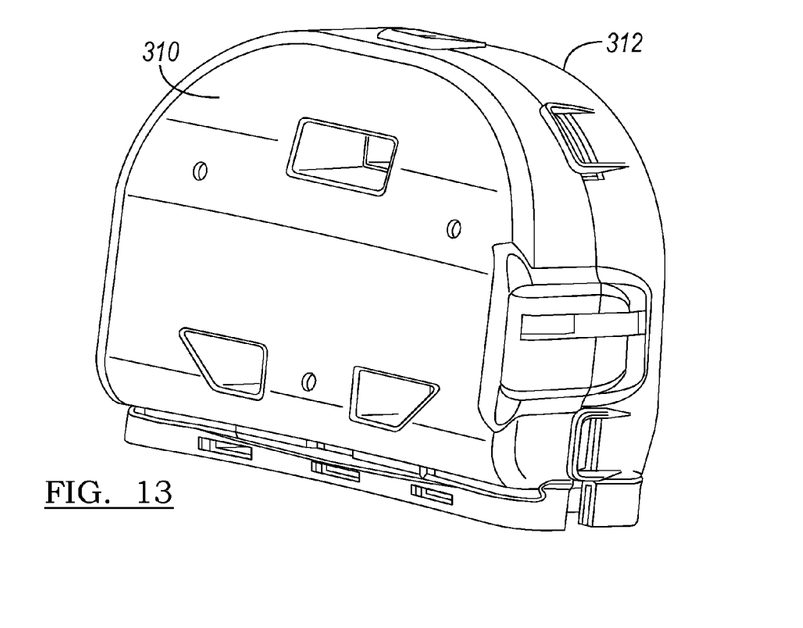
FIG. 13 is a perspective view of the head restraint assembly of FIG. 7, illustrated partially disassembled.

FIG. 12 illustrates another head restraint assembly 300 that is similar to the prior embodiments and includes a head restraint 302 upon a support post 304. A traverse member 306 is provided on the support post 304 and supports a locking mechanism 126 that is also similar to the prior embodiments. The locking mechanism 126 extends into sleeves 308 of the traverse member 306 for engaging the notches 118, 120 provided in the posts 114, 116 of front and rear shells 310, 312. A rocker button assembly 314, similar to the rocker button assembly 222 may be provided on the shells 310, 312. The rocker button assembly 314 includes a lever 316 that is pivotally mounted relative to the shells 310, 312. The lever 316 includes a generally planar manual input surface for being depressed by an occupant. The rocker button assembly 314 cooperates with a push rod 318 of the locking mechanism 126. Thus, the locking mechanism 126 can be disengaged by pivoting of the lever 316 instead of pushing a linear push button. The rocker button assembly is also more compact that prior art linear push buttons by employing a mechanical advantage that is not available when directly pushed by the occupant.

Figure 14:
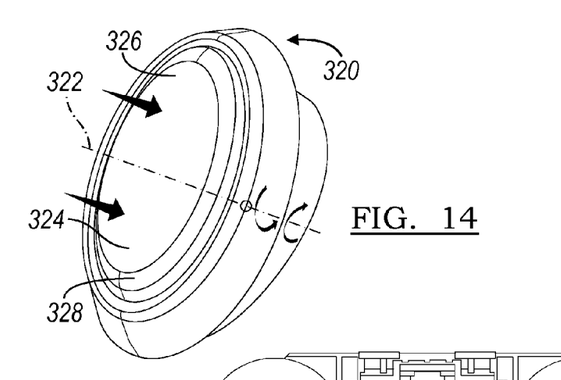
FIG. 14 is a perspective view of a button assembly according to another embodiment.

FIG. 14 illustrates a rocker button assembly 320 according to an alternate embodiment in which the rocker button assembly 320 may pivot in at least two directions. The rocker button 320 may have a pivot axis 322 about which the rocker button 320 pivots. The rocker button 320 may have a generally planar button face 324 and may be actuated to a first pivot position when the rocker button 320 is depressed by an occupant on a first end 326. Likewise, the rocker button 320 may be actuated to a second pivot position when the rocker button 320 is depressed by an occupant on a second end 328.

Figure 15:
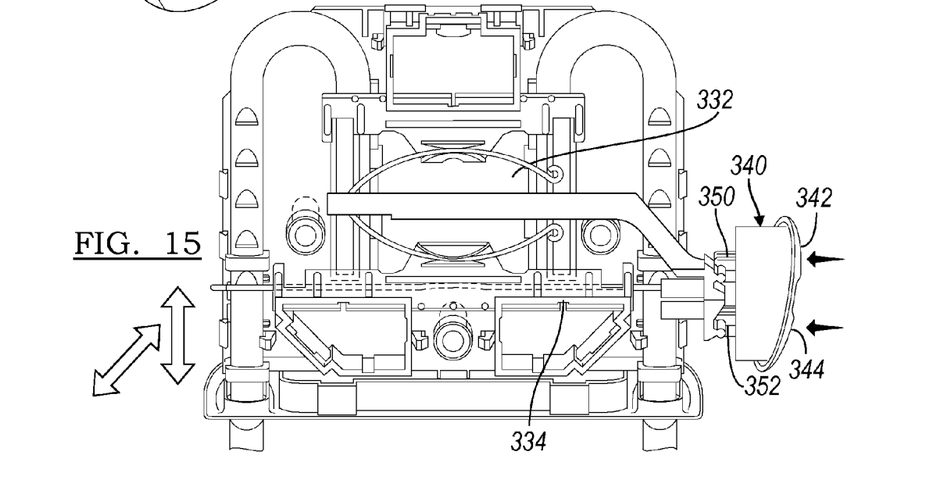
FIG. 15 is a perspective view of a movable head restraint assembly according to another embodiment, illustrated partially disassembled.

Referring now to FIG. 15, the rocker button 320 may be utilized by a head restraint assembly 330. FIG. 15 illustrates a head restraint assembly 330 which includes at least two locking mechanisms. The first locking mechanism 332 may allow adjustment of the head restraint 102 relative to the seat back in the fore and aft direction. The operation of the first locking mechanism 332 is also illustrated and described in German patent application number DE 10 2010 003 349.9. The second locking mechanism 334 may allow adjustment of the head restraint 102 relative to the seat back in the upright direction. The operation of the second locking mechanism 334 is also illustrated and described in U.S. Pat. No. 7,562,936 filed on Aug. 29, 2008 and issued on Jul. 21, 2009, the disclosure of which is incorporated by reference in its entirety.

The rocker button 330 may be connected to the first locking mechanism 332 along the first end 326. Actuating the rocker button 330 to the first pivot position may disengage the first locking mechanism 332 so that the occupant may adjust the head restraint 102 in a direction fore and aft. Similarly, the rocker button 330 may be connected to the second locking mechanism 334 adjacent the second end 328 so that actuating the rocker button 330 to the second pivot position may disengage the second locking mechanism 334, thereby allowing the head restraint 102 to be adjusted in the upright direction.

Figure 16:
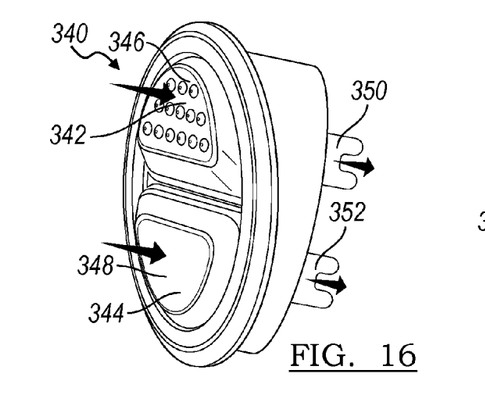
FIG. 16 is a perspective view of a button assembly of the head restraint assembly of FIG. 16 according to an alternate embodiment

FIG. 16 illustrates a button assembly Figure an alternate dual-button assembly 340 which may be used with the head restraint 330 in FIG. 15. The dual-button assembly 340 may include a first button 342 and a second button 344 located adjacent to each other. The first and second buttons may have button faces 346, 348 respectively.

The first button 342 and second button 344 may be push buttons such that the button faces 346, 348 slide in the lateral direction when the push buttons are actuated by an occupant. The first and second buttons may have push bars 350, 352 respectively which extend perpendicularly from the button faces 346,348. The push bars 350, 352 may also include an attachment feature, such as an aperture, for connecting to the first locking mechanism 332 and second locking mechanism 334.

Referring back to FIG. 15, the first push button 342 may be connected to the first locking mechanism 332 by the first push bar 350. Actuating the first push button may disengage the first locking mechanism 332 so that the occupant may adjust the head restraint 330 in a direction fore and aft. Similarly, the second push button 344 may be connected to the second locking mechanism 334 by the second end so that actuating the second push button 344 may disengage the second locking mechanism 332, thereby allowing the head restraint 102 to be adjusted in the upright direction. The first push button 342 and the second push button 344 may be simultaneously actuated by an occupant thereby unlocking both the first locking mechanism 332 and the second locking mechanism 334 at the concurrently. Therefore, the head restraint 330 may be adjusted in both the fore-aft direction and upright directions at the same time.

Figure 17:
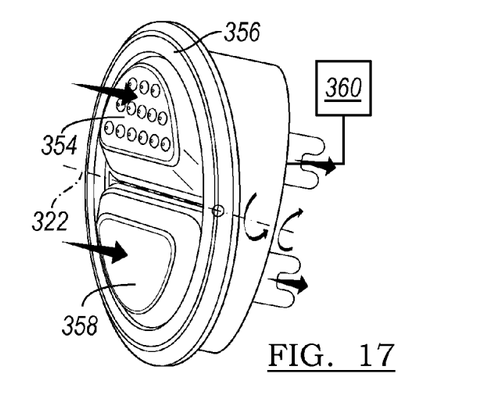
FIG. 17 is a perspective view of a button assembly of the head restraint assembly of FIG. 16 according to an alternate embodiment.

Referring now to FIG. 17, it is also contemplated that at least one of the first button 342 and second button 344 may be rocker buttons which pivot about a pivot axis. For example, the first button 342 may be a rocker button 354 which pivots about a pivot axis 356 while the second button 344 is a push button 358 which moves linearly in the lateral direction when manually actuated. In an alternate embodiment, at least one of the rocker button 354 or the push button 358 may be motorized so that the button is connected to a motor 360 which function to disengage or cooperate with the first locking mechanism 332, for example.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle head restraint assembly comprising:
a first guide member mounted proximate to a vehicle seat back;
a second guide member mounted to the first guide member for movement in a fore and aft direction;
a head restraint mounted to the second guide member;
a locking mechanism comprising a biasing member;
wherein one of the first guide member and the second guide member has a series of notches formed therein spaced incrementally in the fore and aft direction, and the locking mechanism is mounted to the other of the first guide member and the second guide member for extending into one of the series of notches for locking the second guide member at an incremental position relative to the first guide member;
wherein the biasing member biases the locking mechanism into engagement with the series of notches;
a first actuator mounted to one of the first guide member and the second guide member for actuation in a lateral direction from one lateral side of the head restraint, the first actuator cooperating with the locking mechanism such that linear actuation of the first actuator from the one lateral side results in compression of the biasing member to disengage the locking mechanism from the series of notches for permitting adjustment of the fore and aft position of the head restraint relative to the vehicle seat back;
a second actuator mounted to the one of the first guide member and the second guide member for actuation in a direction perpendicular to the lateral direction, the second actuator cooperating with the first actuator such that linear actuation of the second actuator results in linear actuation of the first actuator; and
a rack and pinion assembly mounted to the one of the first guide member and the second member for converting the linear actuation of the second actuator in the direction perpendicular to the lateral direction, to the linear actuation of the first actuator in the lateral direction.

2. The vehicle head restraint assembly of claim 1 wherein the rack and pinion assembly comprises:
a first gear rack mounted to the one of the first guide member and the second guide member for linear actuation in the direction perpendicular to the lateral direction, the first gear rack being operably connected to the second actuator for being actuated by the second actuator;
a pinion gear pivotally mounted to the one of the first guide member and the second guide member, in engagement with the first gear rack; and
a second gear rack provided on the first actuator in engagement with the pinion gear so that linear actuation of the second actuator and consequently the first gear rack rotates the pinion gear thereby actuating the second gear rack and the first actuator.

3. The vehicle head restraint assembly of claim 1 further comprising a flexible member connecting the first actuator and the second actuator; and
wherein the vehicle head restraint assembly further comprises a guide for constraining a path of movement of the flexible member.

4. The vehicle head restraint assembly of claim 3 wherein the flexible member is arcuate about a radius with an axis in the fore and aft direction.

5. The vehicle head restraint assembly of claim 4 wherein the flexible member has a rectangular cross section with a width in the fore and aft direction and a thickness in a radial direction, and wherein the width is greater than the thickness.

6. The vehicle head restraint assembly of claim 1 further comprising a slide button connected to the second actuator for manual actuation of the second actuator.

7. The vehicle head restraint assembly of claim 6 wherein the first actuator and the second actuator are provided on the first guide member; and
wherein the slide button is provided on the second guide member.

8. The vehicle head restraint assembly of claim 1 wherein the biasing member comprises a leaf spring.

9. The vehicle head restraint assembly of claim 1 further comprising:
a plurality of posts extending from one of the first guide member and the second guide member, the plurality of posts being received in the other of the first guide member and the second guide member; and
a plurality of biasing members each oriented about one of the posts in engagement with the first guide member and the second guide member to bias the head restraint to a reset position upon actuation of the actuator.

10. The vehicle head restraint assembly of claim 1 wherein the second actuator comprises a lever.

11. The vehicle head restraint assembly of claim 10 wherein the lever further comprises a planar manual input surface for depression by an occupant.

12. The vehicle head restraint assembly of claim 10 wherein the first actuator is provided on the first guide member and the second actuator is provided on the second guide member.

13. A vehicle head restraint assembly comprising:
a first guide member mounted proximate to a vehicle seat back;
a second guide member mounted to the first guide member for movement in a fore and aft direction;
a head restraint mounted to the second guide member;
a locking mechanism comprising a biasing member;
wherein one of the first guide member and the second guide member has a series of notches formed therein spaced incrementally in the fore and aft direction, and the locking mechanism is mounted to the other of the first guide member and the second guide member for extending into one of the series of notches for locking the second guide member at an incremental position relative to the first guide member;
wherein the biasing member biases the locking mechanism into engagement with the series of notches;
a first actuator mounted to one of the first guide member and the second guide member for actuation in a lateral direction from one lateral side of the head restraint, the first actuator cooperating with the locking mechanism such that linear actuation of the first actuator from the one lateral side results in compression of the biasing member to disengage the locking mechanism from the series of notches for permitting adjustment of the fore and aft position of the head restraint relative to the vehicle seat back;
a second actuator mounted to the one of the first guide member and the second guide member for actuation in a direction perpendicular to the lateral direction, the second actuator cooperating with the first actuator such that linear actuation of the second actuator results in linear actuation of the first actuator;
an intermediate mechanism mounted to the one of the first guide member and the second member for converting the linear actuation of the second actuator in the direction perpendicular to the lateral direction, to the linear actuation of the first actuator in the lateral direction;
wherein the intermediate mechanism comprises a flexible member connecting the first actuator and the second actuator;
wherein the vehicle head restraint assembly further comprises a guide for constraining a path of movement of the flexible member;
wherein the flexible member is arcuate about a radius with an axis in the fore and aft direction; and
wherein the flexible member has a rectangular cross section with a width in the fore and aft direction and a thickness in a radial direction, and wherein the width is greater than the thickness.

14. A vehicle head restraint assembly comprising:
a first guide member mounted proximate to a vehicle seat back;
a second guide member mounted to the first guide member for movement in a fore and aft direction;
a head restraint mounted to the second guide member;
a locking mechanism comprising a biasing member;
wherein one of the first guide member and the second guide member has a series of notches formed therein spaced incrementally in the fore and aft direction, and the locking mechanism is mounted to the other of the first guide member and the second guide member for extending into one of the series of notches for locking the second guide member at an incremental position relative to the first guide member;
wherein the biasing member biases the locking mechanism into engagement with the series of notches;
a first actuator mounted to one of the first guide member and the second guide member for actuation in a lateral direction from one lateral side of the head restraint, the first actuator cooperating with the locking mechanism such that linear actuation of the first actuator from the one lateral side results in compression of the biasing member to disengage the locking mechanism from the series of notches for permitting adjustment of the fore and aft position of the head restraint relative to the vehicle seat back;
a second actuator mounted to the one of the first guide member and the second guide member for actuation in a direction perpendicular to the lateral direction, the second actuator cooperating with the first actuator such that linear actuation of the second actuator results in linear actuation of the first actuator;
a plurality of posts extending from one of the first guide member and the second guide member, the plurality of posts being received in the other of the first guide member and the second guide member; and
a plurality of biasing members each oriented about one of the posts in engagement with the first guide member and the second guide member to bias the head restraint to a reset position upon actuation of the actuator.

* * * * *